United States Patent
Diewald et al.

(10) Patent No.: US 7,906,999 B2
(45) Date of Patent: Mar. 15, 2011

(54) SELF-PROTECTING CORE SYSTEM

(75) Inventors: Horst Diewald, Freising (DE); Michael Zwerg, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 127 days.

(21) Appl. No.: 12/397,179

(22) Filed: Mar. 3, 2009

(65) Prior Publication Data

US 2010/0176859 A1 Jul. 15, 2010

Related U.S. Application Data (60) Provisional application No. 61/141,391, filed on Dec. 30, 2008.

(51) Int. Cl.
*H03K 3/00* (2006.01)
(52) U.S. Cl. .................. 327/299; 327/291; 327/298
(58) Field of Classification Search .................. 327/299, 327/291
See application file for complete search history.

(56) References Cited

U.S. PATENT DOCUMENTS

| | | | | |
|---|---|---|---|---|
| 5,192,914 A * | 3/1993 | Sudo et al. | ...................... | 327/34 |
| 5,668,679 A * | 9/1997 | Swearingen et al. | ........... | 360/75 |
| 5,974,259 A * | 10/1999 | Casal et al. | ................... | 713/300 |
| 6,084,441 A * | 7/2000 | Kawai | .............. | 327/99 |
| 6,587,961 B1 | 7/2003 | Garnett et al. | | |
| 6,653,871 B2 * | 11/2003 | Masuda et al. | .................. | 327/99 |
| 2005/0262376 A1* | 11/2005 | McBain | ....................... | 713/600 |
| 2007/0038795 A1* | 2/2007 | Kadomaru | .................... | 710/315 |

FOREIGN PATENT DOCUMENTS

DE    10 2006 026 914    12/2007

\* cited by examiner

*Primary Examiner* — Lincoln Donovan
*Assistant Examiner* — Ryan C Jager
(74) *Attorney, Agent, or Firm* — Robert D. Marshall, Jr.; W. James Brady; Frederick J. Telecky, Jr.

(57) ABSTRACT

The present invention is applicable to an electronic device including a master, a slave, a bus coupling the master and the slave and a clock generator for providing a system clock to the master and slave. The clock generator determines whether the received data is correct on a cycle-by-cycle basis. The clock generator suppresses an edge of a next clock cycle of the system clock signal if the data is not to be correct. The clock generator allows the edge of a next clock cycle of the system clock signal if the data is correct.

6 Claims, 8 Drawing Sheets

SELF-PROTECTING CORE SYSTEM

CLAIM OF PRIORITY

This application claims priority under 35 U.S.C. 119(a) to German Patent Application No. 10 2008 120 285.8 filed Mar. 3, 2009 and under 35 U.S.C. 119(e)(1) to U.S. Provisional Application No. 61/141,391 filed Dec. 30, 2008.

TECHNICAL FIELD OF THE INVENTION

The technical field of this invention is an electronic device comprising a master, a slave, a bus and a clock generator providing a system clock and a corresponding method.

BACKGROUND OF THE INVENTION

A critical part in a microcontroller system is program execution, which should never be out of control. Many deficiencies or unexpected situations can be successfully managed by protection or secure system control functions as for example the use of watchdog circuits. A critical situation which can not be handled by a watchdog circuit occurs if parts or all of the system fail to comply with the system clock frequency. In this situation a slave memory may not be able to deliver the data on time without corrective action. The system will most likely fail. A master such as a central processing unit (CPU) is driven by a system clock. A data bus connects the master and slaves. The slaves are typically memories or peripheral modules. The instruction memory is usually a flash or read only memory (ROM). The data memory is typically random access memory (RAM). However, a program may also be executed from RAM. The timing for transferring any kind of data including instructions or data relating is based on the system clock frequency. If a slave is too slow, data may not be delivered to the master in time. Inherent data bandwidth or speed limitations and many other implications may cause a delay of the data transfer from a slave to a master. This results in incomplete or incorrect received data. A conventional way to ensure that the maximum frequency of the system clock is not too high for the components of the system sets a predetermined maximum frequency or a set of safe-area-off-operation parameters is given. These parameters must be met by the user. Other solutions use a reference measurement to control the maximum clock frequency. This maintains a reliable system clock. Most of the prior art solutions rely on a system level control mechanism which sets the frequency of the system clock to comply with the slowest component or with a critical path with the maximum delay. This limits the overall data or program throughput by the slowest component or the critical path. Thus the system may not achieve maximum performance. Another conventional approach introduces wait states for a slow slave which requires more response time. This allows a comparably high clock frequency to be used for the reminder of the system except for those parts needing wait states. Timing parameters and the number of wait states has to be determined based on the worst-case electrical characteristics of the slave. Accordingly, a prior art electronic device including a master and slave will hardly ever achieve maximum performance.

SUMMARY OF THE INVENTION

According to an important aspect of the present invention, an electronic device includes a master, a slave and a bus coupling the master and the slave to transmit data. A clock generator provides a system clock for the master and the slave. The clock generator determines whether the received data is correct and suppresses an edge of a next clock cycle of the system clock signal if the data is not to be correct. The clock generator also allows an edge of a next clock cycle of the system clock signal if the data is correct. Allowance and suppression of clock cycles is performed on a clock cycle by cycle basis. The invention also determines whether the received data is correct on a clock cycle by clock cycle basis. The evaluation of data integrity depends on a signal issued by the slave indicating that data is complete. However, many different ways of determining data integrity are conceivable. Accordingly, the clock generator evaluates or checks the received data and determines whether the received data is complete or correct. If data integrity is confirmed, the next system clock cycle can occur without any risk. If the received data is incorrect, which may happen if the received data is incomplete, the edge of a next clock cycle of the system clock is suppressed. Received data is evaluated on a clock cycle by clock cycle basis. Thus incoming data is continuously evaluated or monitored in order to identify any mistakes. Any error in the received data may relate to a critical data path or a slave device which is too slow to transfer data at the system clock rate. Because the system clock is adapted based on a clock cycle by clock cycle evaluation, the electronic device of this invention can immediately handle and comply with all kinds of delays or deficiencies of internal data communication. Prior art systems detect data errors typically only become aware of errors after the data has entered the master. The system clock is then reduced after the error has already occurred. The clock generator of the present invention is implemented separately and independently from the master and reacts immediately during each clock cycle before the corrupt data reaches the master. This handles and removes all possible errors or delays outside the master and before the master receives the data. This invention provides better stability and reliability than prior art systems by detecting incorrect data before the master has a chance to operate on the data. The electronic device of this invention does not need to be generally set to a minimum clock frequency or a maximum number of wait states in order to cope with worst-case components and interconnect conditions. Suppression of an edge of the next cycle of the system clock signal can end as soon as data integrity is reestablished. The clock frequency can be increased or decreased according to the immediate conditions and needs of the system. This substantially increases performance of the system.

In another aspect of this invention, the clock generator suppresses the edge of the next clock cycle of the system clock by selectively reducing the frequency of the system clock signal. The whole system is slowed down by reducing the system clock if received data is incorrect. This advantageously suppresses the edge of a next clock cycle. According to another aspect of the invention, the clock generator includes a multiplexer receiving the system clock signal and a variable clock divider. The variable clock divider output connects to a second input of the multiplexer. The multiplexer switches the output between the system clock signal and the variably divided system clock signal. The multiplexer selects an output in response to whether the received data is correct. It is possible to variably decrease the clock frequency and to quickly resume the original clock frequency. The clock frequency is performed by a clock divider having a divider ratio N. When an edge of the next clock cycle of the system clock has to be suppressed, the clock divider ratio is increased. The clock divider ratio N can then be frozen or slowly decreased, if the received data is correct again.

Another aspect of the present invention provides a method for generating a system clock signal. The system includes a master and a slave. Data is transmitted from the slave to the master. The invention determines whether the received data is correct. An edge of a next clock cycle of the system clock is suppressed if the data is not correct. The edge of the next clock signal of the system clock signal is allowed if the data is correct. Allowance and suppression of clock cycles and evaluation of the received data is performed on a clock cycle by clock cycle basis. The system clock frequency is reduced to suppress or delay an edge of the next clock cycle of the system clock. It is also possible to divide the system clock signal by a specific factor N to increase the delay required until the data is correct.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
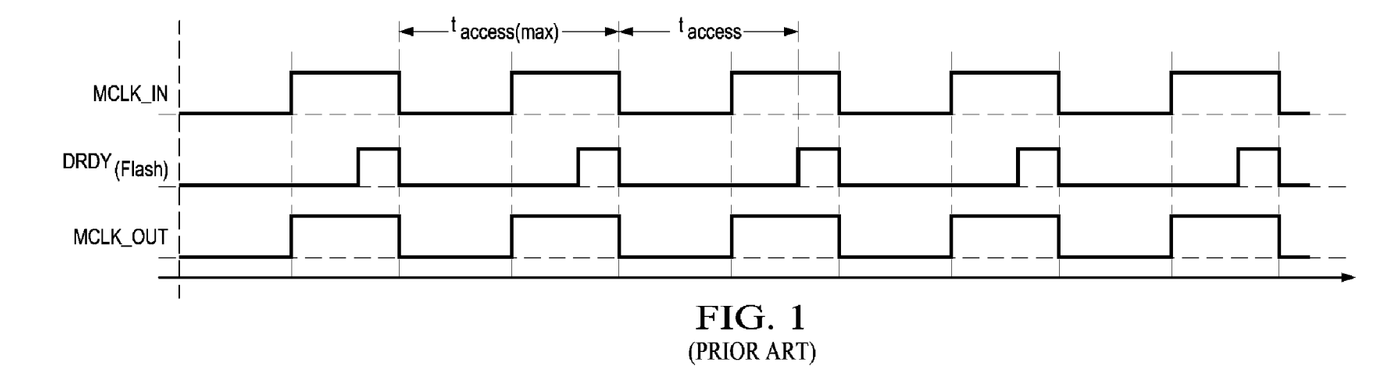
FIG. 1 illustrates waveforms of signals of a prior art system.

FIG. 1 illustrates waveforms of signals of a prior art electronic device including a master and a slave and a bus. In the prior art system clock MCLK_IN is used for the master and the slave without any adjustment or adaptation as system clock signal MCLK_OUT. This example assumes the slave is a flash memory which issues a data ready signal DRDY when data transfer is complete. Thus the slave itself evaluates whether the transmitted data is complete. Signal DRDY is used by the master to determine data integrity. The actual data response access time $t_{access}$ of the flash memory is lower than maximum access time $t_{access(max)}$ for the frequency of system clock MCLK_OUT. The master device reads the received data at a falling edge of system clock signal MCLK_OUT. Because the actual access time $t_{access}$ is lower than maximum access time $t_{access(max)}$, the received data is always on time and errors will not occur.

Figure 2:
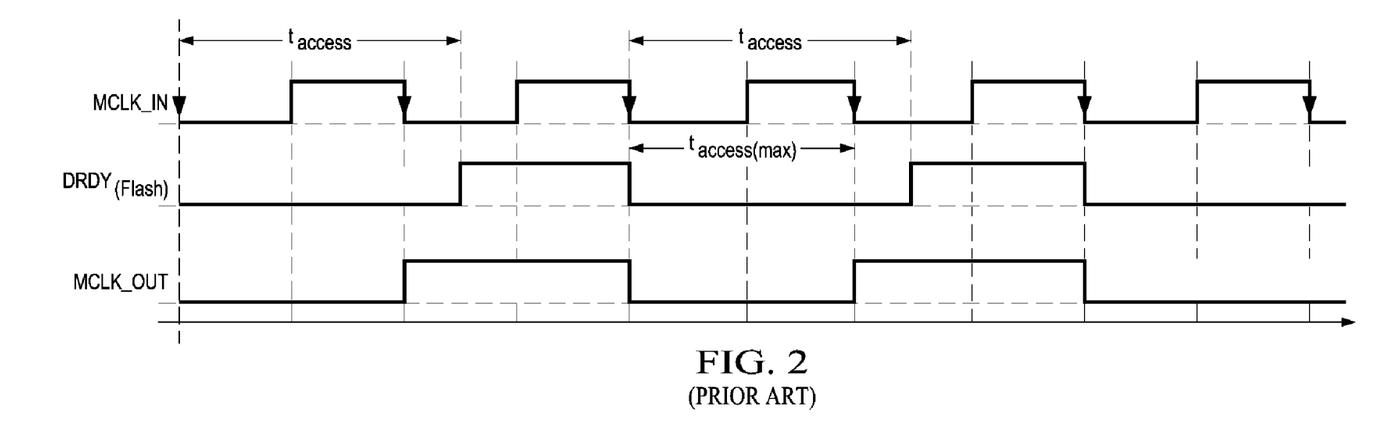
FIG. 2 illustrates waveforms of signals of a prior art system.

FIG. 2 illustrates waveforms of signals of a prior art system in a different situation. In FIG. 2, maximum access time $t_{access(max)}$ is shorter than the actual access time $t_{access}$. The data response data ready signal DRDY from the flash memory will always be too late for the system clock signal MCLK_OUT for the master and the slave. Therefore, the system clock frequency MCLK_OUT is reduced by a factor of two with respect to MCLK_IN. The data transfer between the flash memory and the master is thus two times slower than in FIG. 1.

Figure 3:
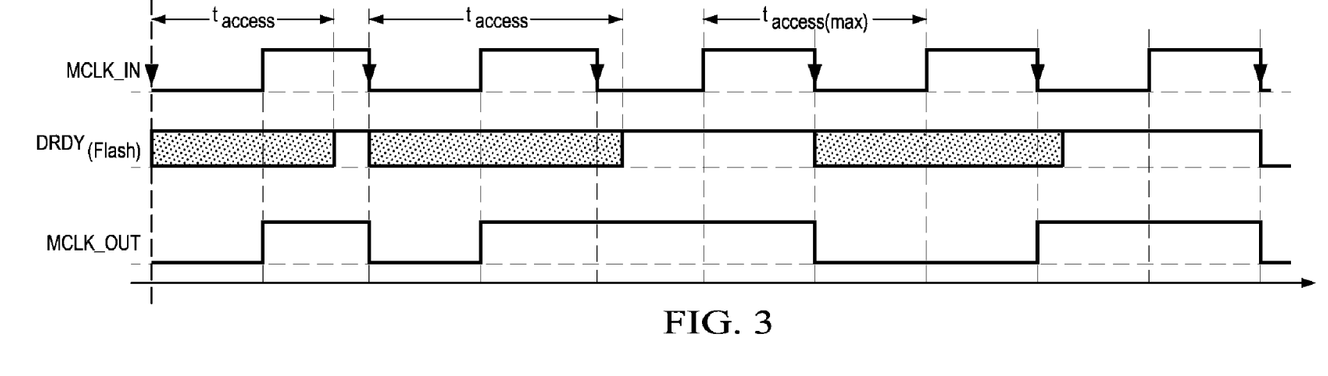
FIG. 3 illustrates waveforms of signals of a first embodiment of the present invention.

FIG. 3 illustrates waveforms of signals of a prior art system where the actual data response access $t_{access}$ varies. During a first cycle, the access time $t_{access}$ is within maximum access time $t_{access(max)}$. During a second cycle, the access time $t_{access}$ exceeds maximum access time $t_{access(max)}$. In this situation the system clock frequency MCLK_OUT is generally reduced by a factor of two. Changing operating conditions can occur during full operation, in sleep modes or after startup. A conventional system will then reduce the clock frequency and maintain the slower clock frequency during further operation in order to recover.

Figure 4:
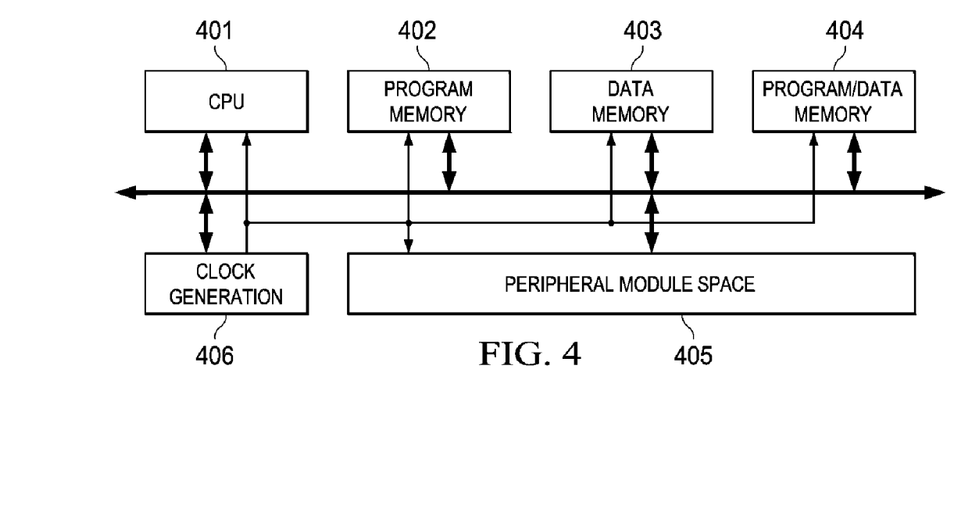
FIG. 4 illustrates a general block diagram of a conventional electronic device to which the present invention is applicable.

FIG. 4 illustrates a block diagram of a prior art electronic device to which the present invention is applicable. The master device is a central processing unit (CPU) 401. There are several slave devices including program memory 402, data memory 403, program and data memory 404 and peripheral module space 405. Clock generator 405 may either internally generate system clock signal MCLK_OUT or it may receive an external clock signal MCLK_IN and derive internal system clock signal MCLK_OUT from clock signal MCLK_IN. Execution and completion of any activity must be performed within a predetermined number of clock cycles of system clock MCLK_OUT. If any of the activities is not ready on time, the system may continue without visible effect. However, it may totally fail. The system illustrated in FIG. 4 may use watchdog mechanisms to reset if software execution fails. This is a final resort to handle errors which have already occurred. A standard watchdog mechanism can not prevent individual instructions from failed execution based data integrity.

Figure 5:
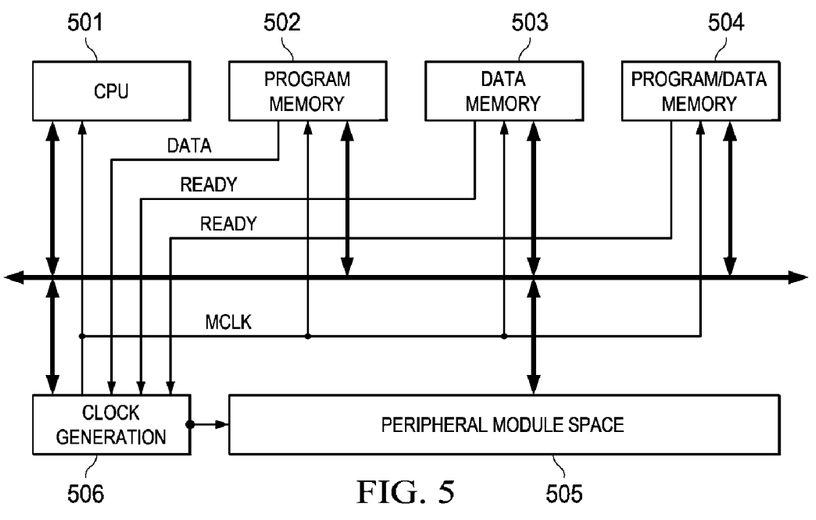
FIG. 5 illustrates a block diagram of an embodiment of the present invention.

FIG. 5 illustrates a simplified block diagram of an electronic device according to this invention. FIG. 5 includes master CPU 501, several slaves including program memory 502, data memory 503 or mixed program and data memory 504 and peripheral module space 505. Each of the slaves provides a corresponding data ready signal DRDY1, DRDY2, DRDY3 and DRDY4 to clock generator 506. Master CPU 501, slaves program memory 502, data memory 503 or mixed program and data memory 504 and peripheral module space 505, and clock generator 506 are coupled by bus transmitting and receiving data, such as program instructions, addresses or data. Clock generator 506 evaluates each of the data ready signals DRDY1, DRDY2, DRDY3 and DRDY4 to determine whether the data received from each of slave device program memory 502, data memory 503 or mixed program and data memory 504 or peripheral module space 505 is complete or correct. Based upon the evaluation result, system clock signal MCLK_OUT used for data communication between the master and the slave devices is slowed down, maintained or accelerated.

Figure 6:
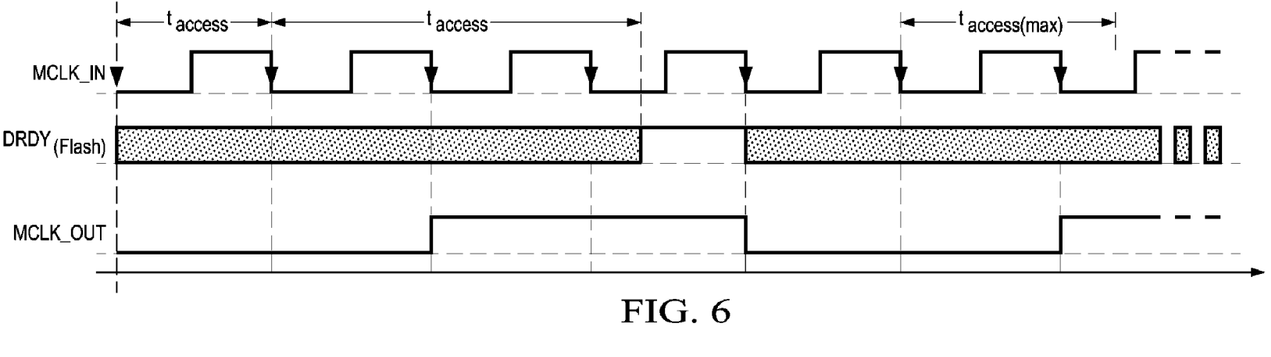
FIG. 6 illustrates waveforms of signals of the present invention.
Figure 7:
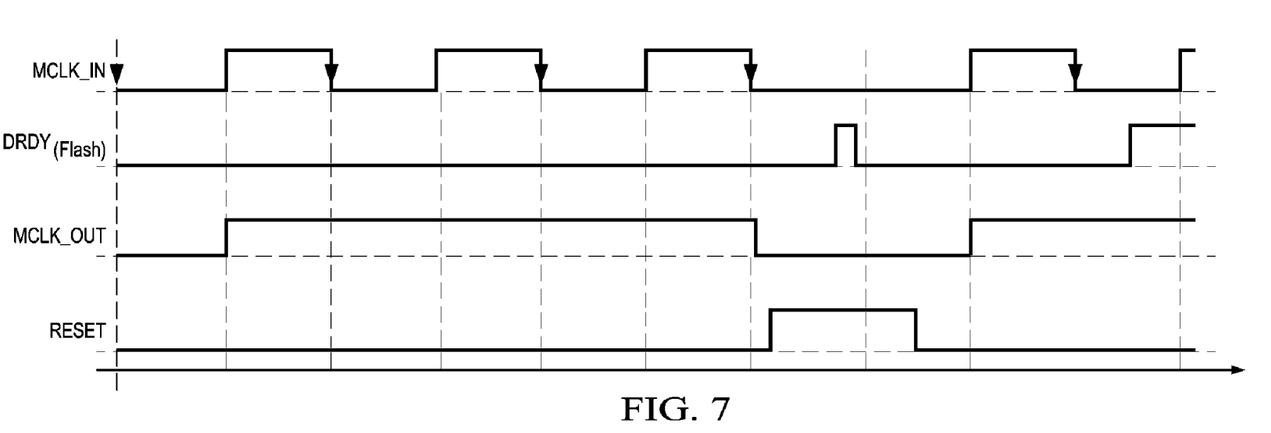
FIG. 7 illustrates waveforms of signals of another an embodiment of the present invention.

Figure 6 illustrates waveforms of signals of an embodiment of this invention. The clock generator suppresses or delays the next edge or clock cycle of the system clock signal infinitely until the data delivered from any slave device is correct. In FIG. 6 the next falling edge of system clock signal MCLK_OUT is delayed until the data ready signal DRDY representing one of data ready signals DRDY1 to DRDY4 of FIG. 5 is high. This indicates that data is correct. FIG. 6 illustrates a situation where maximum access time $t_{access(max)}$ is much shorter than actual access time $t_{access}$. In a different embodiment, system clock signal MCLK_OUT may only be suppressed or delayed until either valid data is delivered from one of slave devices program memory 502, data memory 503, program/data memory 504 or peripheral module space 505 of FIG. 5 or a time limit has expired. This time limit is monitored by a watchdog mechanism to issue a reset pulse. In still another embodiment, clock generator 506 may delay or suppress the next clock cycle or the next falling edge of system clock signal MCLK_OUT until valid data is received from the requested slave. As an additional condition, a time limit may be set by a clock control block stage (not shown in FIG. 5). The clock control stage observes a certain number of clock periods and issues a reset signal on reaching the maximum number of clock cycles without receiving valid data. FIG. 7 illustrates corresponding waveforms. Reset pulse RESET is issued after three clock cycles of system clock signal MCLK_IN. This embodiment may be slightly modified so that the clock control stage toggles a flag instead of issuing a reset signal. The flag indicates that the maximum number of clock cycles of the system clock have expired.

Figure 8:
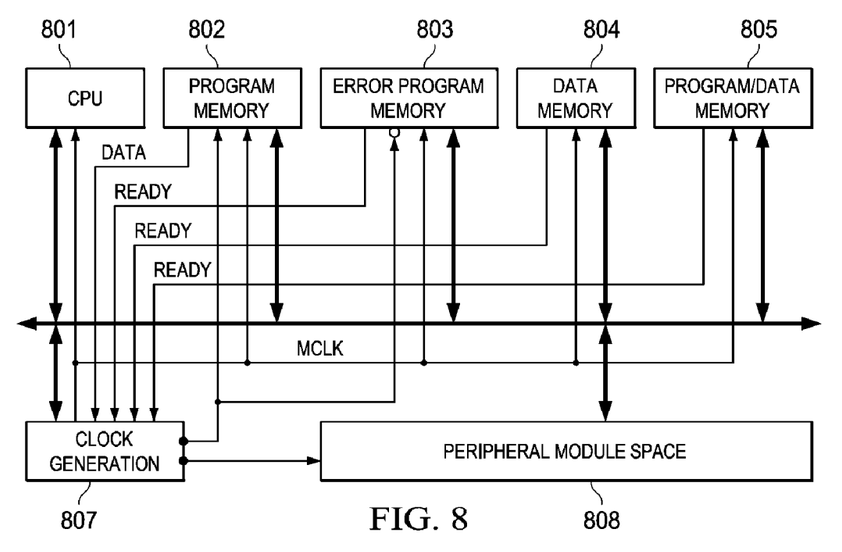
FIG. 8 illustrates a block diagram of another embodiment of the present invention.

FIG. 8 illustrates a simplified block diagram of another embodiment. In this embodiment it is possible to switch from one slave to another. FIG. 8 illustrates master CPU 801, several slaves including program memory 802, error program memory 803, data memory 804, mixed program and data memory 804 and peripheral module space 806, and clock generator 807. For example, it is possible to switch between two similar memory modules if a maximum number of clock cycles expired before valid data has been received. Furthermore, in response to the flag signal the master may switch program execution from program memory 802 to an error program memory 803 illustrated in FIG. 8. FIG. 8 illustrates slave program memory 802 and an additional slave error program memory 803. Program execution may then switch from program memory 802 to error program memory 803 if a timeout occurs. This timeout is determined by counting clock cycles of system clock MCLK_OUT or MCLK_IN.

Figure 9:
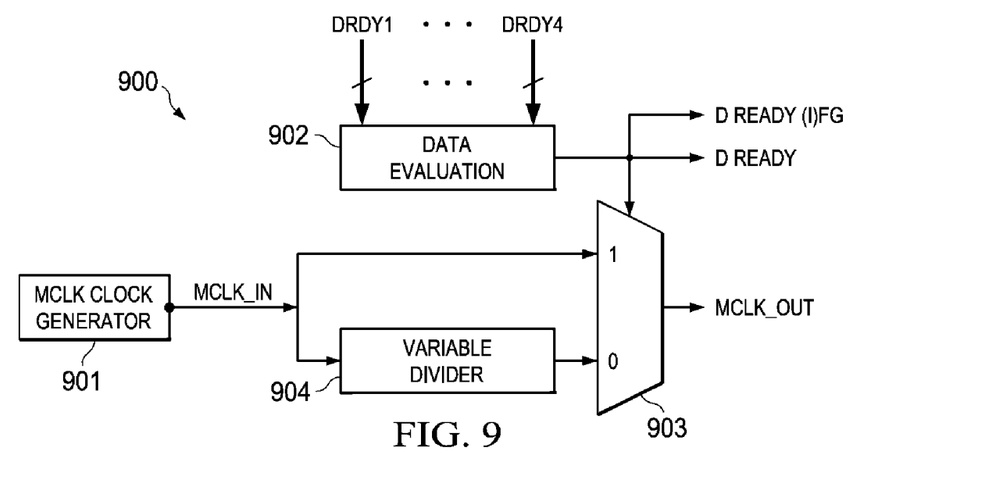
FIG. 9 illustrates a block diagram of a clock generator according the present invention.

FIG. 9 illustrates a simplified block diagram of clock generator 900 according to aspects of the present invention. Clock generator 900 includes master clock generator 901, which provides the system clock signal MCLK_IN. Data evaluation stage 902 receives the data ready signals DRDY1 to DRDY4 from the slaves and provides a control signal for multiplexer 903. The output of multiplexer 903 provides system clock signal MCLK_OUT. The first input of multiplexer 903 receives constant master clock signal MCLK_IN. The second input of multiplexer 903 is coupled to a variable divider stage 904. Variable divider stage 904 divides master clock signal MCLK_IN by a factor of N. Data evaluation stage 902 provides flag signals DRFG indicating whether data is correct and a control signal DRCNTL for controlling multiplexer 903 and optionally other devices. Rather than observing the system frequency of system clock signal MCLK_IN or system clock signal MCLK_OUT, the present invention monitors the execution speed or data communication speed. Error handling activities are only requested or run if corresponding time limits expire without a valid response from a slave. The maximum execution speed in an electronic device of this invention is defined according to target system components and temperature and supply voltage conditions. If the electronic device waits for valid data or valid code, the system can still execute program code or process the application at a different speed. The present invention provides a system or electronic device which can successfully handle different temperature or voltage ranges as well as processing speed variations.

In another embodiment of the invention, data ready signal DRDY1 to DRDY4 may be only a single data ready signal DRDY if data source identification is not required. Master clock signal MCLK_IN shown in FIG. 9 can be divided by a factor of 1 or a higher factor N to ensures a sufficiently low frequency for proper operation. A specific flag signal indicates the actual clock frequency is only a fraction of the original system clock frequency according to the following equation: MCLK_OUT=MCLK_IN/N. This flag indicating fractional frequency operation can be permanently stored until the electronic device is reset. In a different embodiment, master system clock signal MCLK_IN can be initially divided by 1. Upon a first signal indicating data not ready master clock signal MCLK_IN can be divided by a higher factor. Divisor N is stepwise increased until the frequency of system clock signal MCLK_OUT low enough for the electronic device operate correctly. Furthermore, the electronic device may check from time to time or continuously if the divisor can be decreased for return to the frequency.

Figure 10:
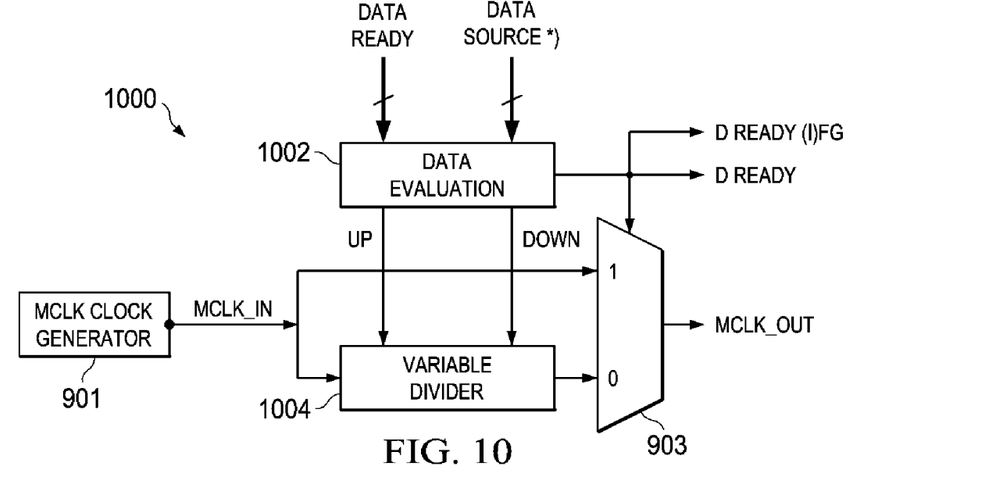
FIG. 10 illustrates a block diagram of a clock generator according to the present invention.

FIG. 10 illustrates a simplified block diagram of another embodiment 1000 of this invention. FIG. 10 is similar to FIG. 9 including master clock generator 901 and multiplexer 904. FIG. 10 differs from FIG. 9 in that variable divider 1004 receives up and down control signals from data evaluation stage 1002 to adjust the divisor of variable divider 1004.

Figure 11:
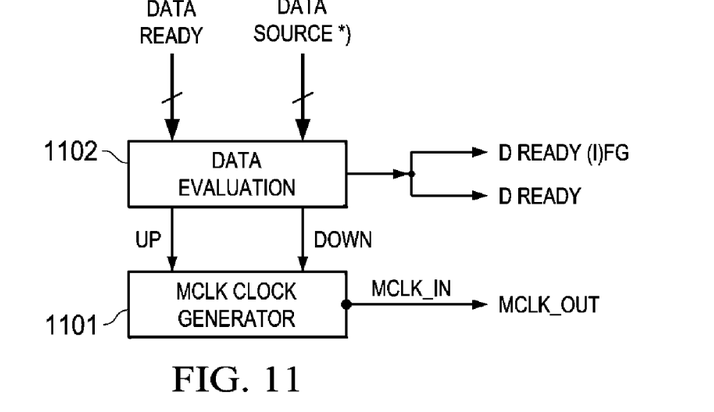
FIG. 11 illustrates a block diagram of a clock generator according to the present invention.

FIG. 11 show a simplified block diagram of another embodiment of this invention. Clock generator 1101 directly adjusts system clock frequency MCLK_OUT in response to up and down control signals from data evaluation stage 1102. Data evaluation stage 1102 operates similar to data evaluation stage 1002 of FIG. 10. If received data is not valid, then system clock signal MCLK_OUT which initially equal MCLK_IN is decreased until the frequency is low enough for the electronic device resume correct operation. The electronic device may occasionally or continuously check whether the system clock frequency can be increased again until the original period of frequency is restored. Master clock generator 1101 can be adjusted using a digital control signal by directly adjusting clock generators such as phase locked loops (PLL) or frequency locked loops (FLL or DLL) or analog oscillators such as RC oscillators.

Figure 12:
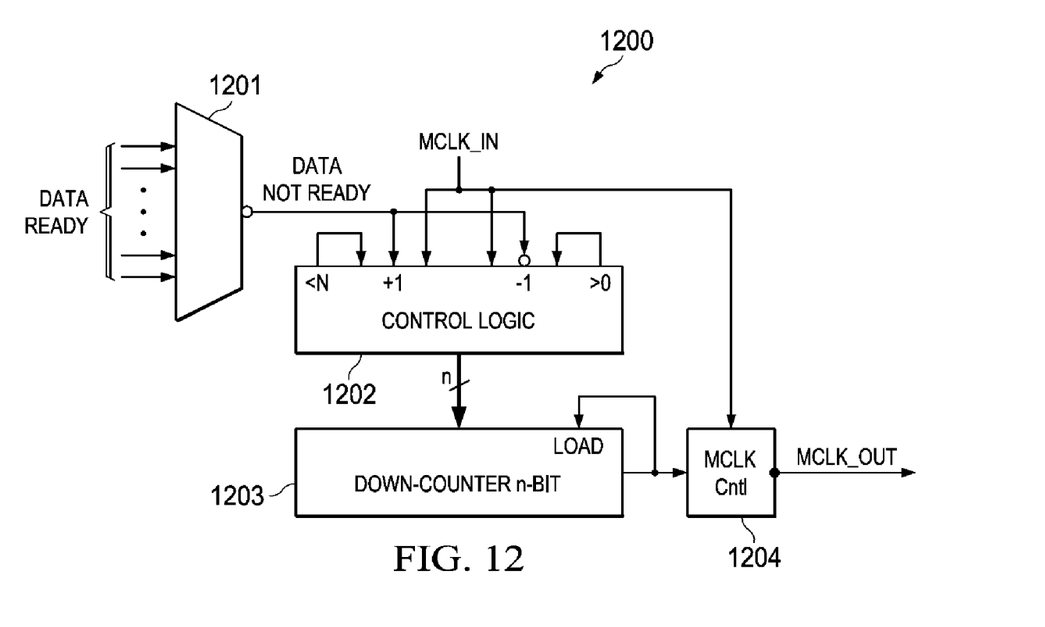
FIG. 12 illustrates a block diagram of a clock generator according to the present invention.

FIG. 12 illustrates a block diagram of another embodiment 1200 of this invention. Clock generator 1200 illustrated in FIG. 12 includes NAND gate 1201 for generating a data not ready signal DNRY based on the four data ready signals DRDY1 to DRDY4. The data not ready signal DNRY is fed to control logic stage 1202 which outputs a value n to down-counter 1203. The division ratio n can be increased or decreased under control of data ready signals DRDY1 to DRDY4. The division ratio may be any integral number for divider ratios of powers of two ($2^n$). Master clock control 1204 generates the resultant master clock signal MCLK-OUT. In this simplified approach allowing only powers of 2 enables a less complex regulation mechanism and helps to save power. However, integral numbers may be permitted to optimally adjust the electronic device to its maximum performance at its maximum system clock frequency. The embodiment of FIG. 12 enables additional control mechanism preventing permanent and disturbing up and down counting of the division ratio n.

Figure 13:
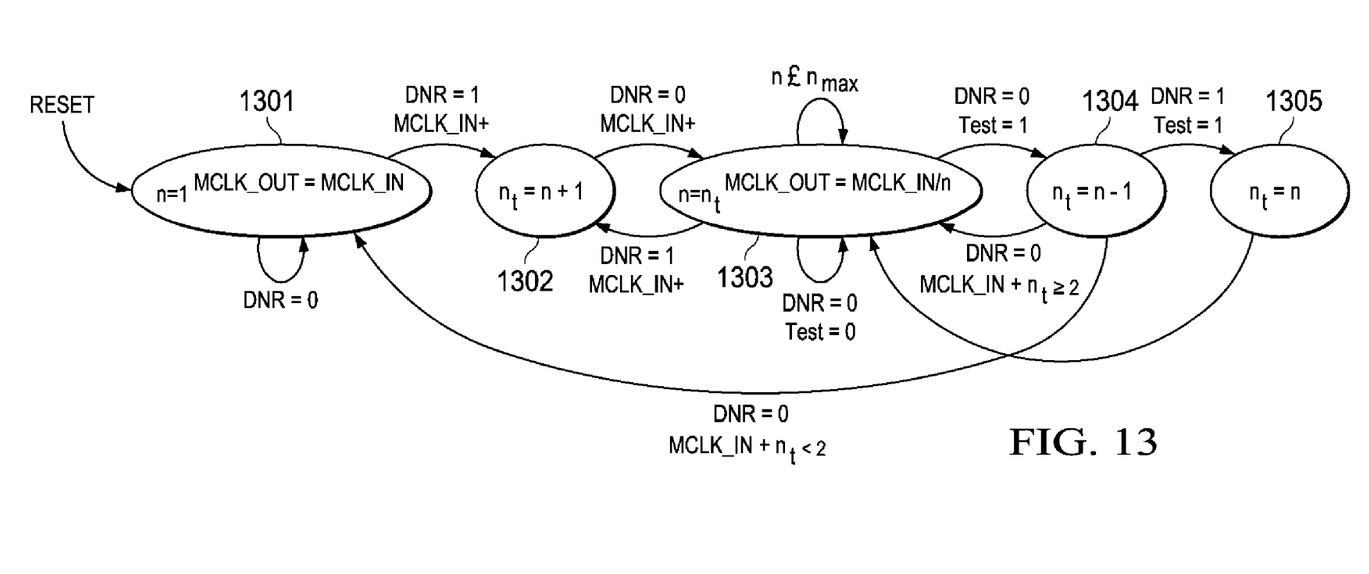
FIG. 13 illustrates a state diagram relating to an embodiment of the present invention.

FIG. 13 illustrates a state diagram of the electronic device shown in FIG. 12. After reset the division ratio n is 1 in state 1301. If data is not ready for a first time, the input DNR is 1 and on a next positive edge of the master clock signal MCLK_IN indicated by MCLK_IN+, then temporary divisor $n_t$ becomes n+1. If data is still not ready, the temporary divisor $n_t$ is increased more and more. If data is ready again as indicated by DNR equaling 0 and with the next positive edge of the system clock signal MCLK_IN (indicated by MCLK_IN+) the master clock control stage 1204 proceeds to state 1303. In state 1303, the divisor n takes over the temporary divisor value n=$n_t$. In this situation, MCLK_OUT=MCLK_IN/n. Only by use of a periodic or occasional test signal Test=1, the control stage can proceed to states 1305 and 1304, where $n_t$=n−1 and $n_t$=n. From state 1304, the state machine returns to state 1301, if DNR=0, MCLK_IN+ and $n_t$<2. From state 1305, the electronic device returns to state 1303, if DNR=0, MCLK_IN+ and $n_t$≧2. The test signal Test serves to time or to trigger any increase of the system clock frequency. The temporary divisor $n_t$ and the test signal serve to prevent the system from permanent switching into data not ready states (DNR=1).

Figure 14:
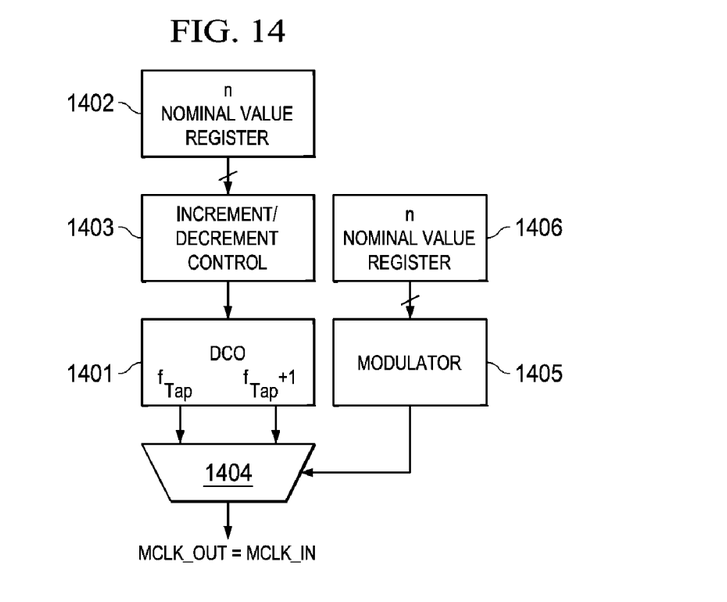
FIG. 14 illustrates a block diagram of a clock generator according to the present invention.

FIG. 14 illustrates a simplified block diagram of another embodiment of this invention. Digital control oscillator 1401 is controlled by a control value n. Control value n has a nominal value of a specific system clock frequency stored in nominal value register 1402. The parameter n can be increased or decreased to change the system clock frequency from its nominal value by in/decrement stage 1403. The value n is passed to digital controlled oscillator 1401 to adjust the oscillating frequency. Digital controller oscillator 1401 outputs two oscillating signals at frequencies $f_{Tap}$ and $f_{Tap+1}$. Multiplexer 1404 selects the system clock signal output from one of two different clock frequencies $f_{Tap}$ and $f_{Tap-1}$. Modulator 1405 also receives the nominal value of n from nominal value register 1406 and switches multiplexer 1404 output signal between the two input signals. This output signal is the system clock signal MCLK_OUT. The final system clock frequency of system clock MCLK_OUT from multiplexer MUX can assume frequencies between $f_{Tap}$ and $f_{Tap+1}$. The system clock frequency can be directly adjusted rather than only decreased from its maximum target value.

Figure 15:
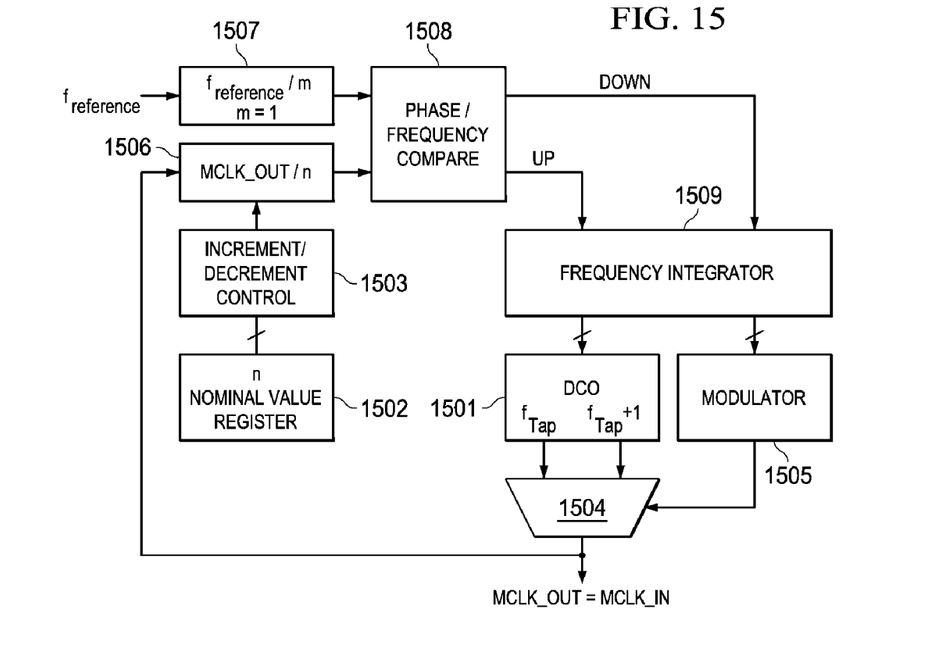
FIG. 15 illustrates a block diagram of a clock generator according to the present invention.

FIG. 15 illustrates a simplified block diagram of another embodiment of this invention. Digital control oscillator 1501, nominal value register 1502, increment/decrement control 1503, multiplexer 1503 and modulator 1504 correspond to similar parts in FIG. 14. These components are now arranged in a control loop. The loop is a frequency locked loop (FLL) that serves to establish system clock signal MCLK_OUT of the target average frequency. Alternatively, a phase locked loop (PLL) can be implemented. A divided clock signal MCLK_OUT/n from divider 1506 is compared with divided reference clock signal $f_{ref}$/m from divider 1507 in phase-frequency compare 1508. The error signal in the form of Up and Down pulses is fed to frequency integrator 1509. Frequency integrator 1509 controls digital control oscillator 1501 and modulator 1505 to set the required average output frequency of output system clock signal MCLK_OUT. The embodiment of FIG. 15 directly provides system clock signal MCLK_OUT with a specific, stable and precise average frequency and/or phase over a wide range of system parameters. This can then be used in accordance with the embodiments and aspects of the present invention as described.

What is claimed is:

1. An electronic device comprising:
   a master;
   a slave;
   a bus coupling the master and the slave to transmit data from the slave to the master; and
   a clock generator providing a system clock to the master and to the slave, said clock generator
   determining whether the received data is correct on a clock cycle-by-cycle basis,
   suppressing an edge of a next clock cycle of the system clock signal if the received data is determined not to be correct, and
   allowing an edge of a next clock cycle of the system clock signal if the received data is determined to be correct.

2. The electronic device according to claim 1, wherein:
   said clock generator suppresses the edge of the next clock cycle of the system clock by reducing the frequency of the system clock signal.

3. The electronic device according to claim 1, wherein:
   said clock generator includes
   a variable clock divider stage having a first input receiving a system clock signal and an output generating a variably divided system clock signal,
   a multiplexer having a first input receiving said system clock signal, a second input connected to said output of said variable clock divider stage and an output selecting either said system clock signal or said variably divided system clock signal.

4. A method for generating a system clock signal in a system comprising a master and a slave, the method comprising:
   transmitting data from the slave to the master;
   determining whether the received data is correct on a clock cycle-by-cycle basis;
   suppressing an edge of a next clock cycle of the system clock signal if the data is determined not to be correct; and
   allowing an edge of the next clock cycle of the system clock signal if the data is determined to be correct.

5. The method according to claim 4, wherein:
   said step of suppressing an edge of the next clock cycle of the system clock reduces the frequency of the system clock signal so as to delay the next edge of the system clock signal.

6. The method according to claim 5, wherein:
   said step of reducing the frequency of the system clock signal divides the system clock signal and adjusts the factor of the division for increasing the delay required until the data is correct.

\* \* \* \* \*